(12) United States Patent
Leys et al.

(10) Patent No.: US 6,595,240 B2
(45) Date of Patent: Jul. 22, 2003

(54) CREEP RESISTANT VALVE

(75) Inventors: John Leys, Victoria, MN (US); Michael Stein, Eden Prairie, MN (US)

(73) Assignee: Entegris, INc., Chaska, MN (US)

( * ) Notice: Subject to any disclaimer, the term of this patent is extended or adjusted under 35 U.S.C. 154(b) by 0 days.

(21) Appl. No.: 09/928,541

(22) Filed: Aug. 13, 2001

(65) Prior Publication Data

US 2002/0066488 A1 Jun. 6, 2002

Related U.S. Application Data

(63) Continuation-in-part of application No. 09/216,656, filed on Dec. 18, 1998, now abandoned.

(51) Int. Cl.[7] ............................................. F16K 11/048
(52) U.S. Cl. ..................................... 137/625.5; 251/80
(58) Field of Search ........................ 137/625.5; 251/343, 251/77, 79, 80, 81

(56) References Cited

U.S. PATENT DOCUMENTS

| | | |
|---|---|---|
| 2,010,129 A | 8/1935 | Baker |
| 3,329,165 A | 7/1967 | Lang |
| 3,332,440 A | 7/1967 | Brakebill |
| 3,540,478 A | 11/1970 | Ito |
| 3,794,075 A | 2/1974 | Stoll et al. |
| 3,815,633 A | 6/1974 | Greenwood |
| 3,827,670 A | 8/1974 | Saarem |
| 3,868,969 A | 3/1975 | Schwenk |
| 4,010,769 A | 3/1977 | De Lorenzo |
| 4,181,154 A | 1/1980 | Oley et al. |
| 4,212,320 A | 7/1980 | Stoll et al. |
| 4,481,971 A | 11/1984 | Farrell et al. |
| 4,669,700 A | 6/1987 | Seidel |
| 4,798,527 A | 1/1989 | Gunda |
| 4,819,691 A | 4/1989 | Lofgren |
| 4,901,751 A | 2/1990 | Story et al. |
| RE33,246 E | 7/1990 | Barree |
| 5,002,086 A | 3/1991 | Linder et al. |
| 5,060,909 A | 10/1991 | Stanic |
| 5,152,498 A | 10/1992 | Korfgen |
| 5,191,915 A | 3/1993 | Elmer |
| RE34,261 E | 5/1993 | Sule |
| 5,261,442 A | 11/1993 | Kingsford |
| 5,295,907 A | 3/1994 | Akkerman |
| 5,335,696 A | 8/1994 | McKenzie |
| 5,345,857 A | 9/1994 | Murphy |
| 5,400,823 A | 3/1995 | Elmer |
| 5,549,134 A | 8/1996 | Browne et al. |
| 5,649,567 A | 7/1997 | Butler et al. |

FOREIGN PATENT DOCUMENTS

| | | |
|---|---|---|
| CH | 0624197 | 7/1981 |
| GB | 957267 | 5/1964 |
| NL | 23 37 007 | 2/1975 |
| NL | 28 40 486 | 3/1980 |

*Primary Examiner*—John Fox
(74) *Attorney, Agent, or Firm*—Patterson, Thuente, Skaar & Christensen, P.A.

(57) ABSTRACT

A valve made principally of plastic has a creep compensating features providing consistent engagement between valve members and their respective valve seats, minimizing creep, and compensating for any creep that does occur. The features compensate for compression of internal valve components as well as extension of the valve body. In a manually operated three way valve embodiment of the invention, a trapped spring mechanism inserted between an actuator portion and the upper valve member provides the closure force for the upper valve member on the upper valve seat. The first valve member and second valve member connect through a extensible portion. Valves according to the invention are particularly suitable for quarter-turn three-way manual diaphragm valves and for applications in the semiconductor industry.

3 Claims, 3 Drawing Sheets

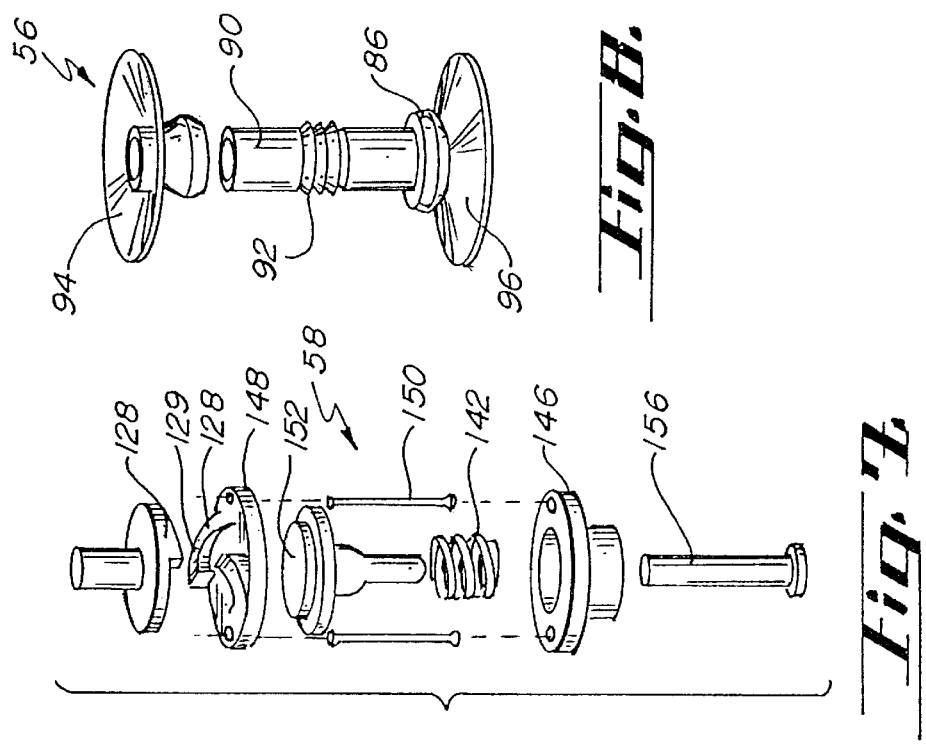
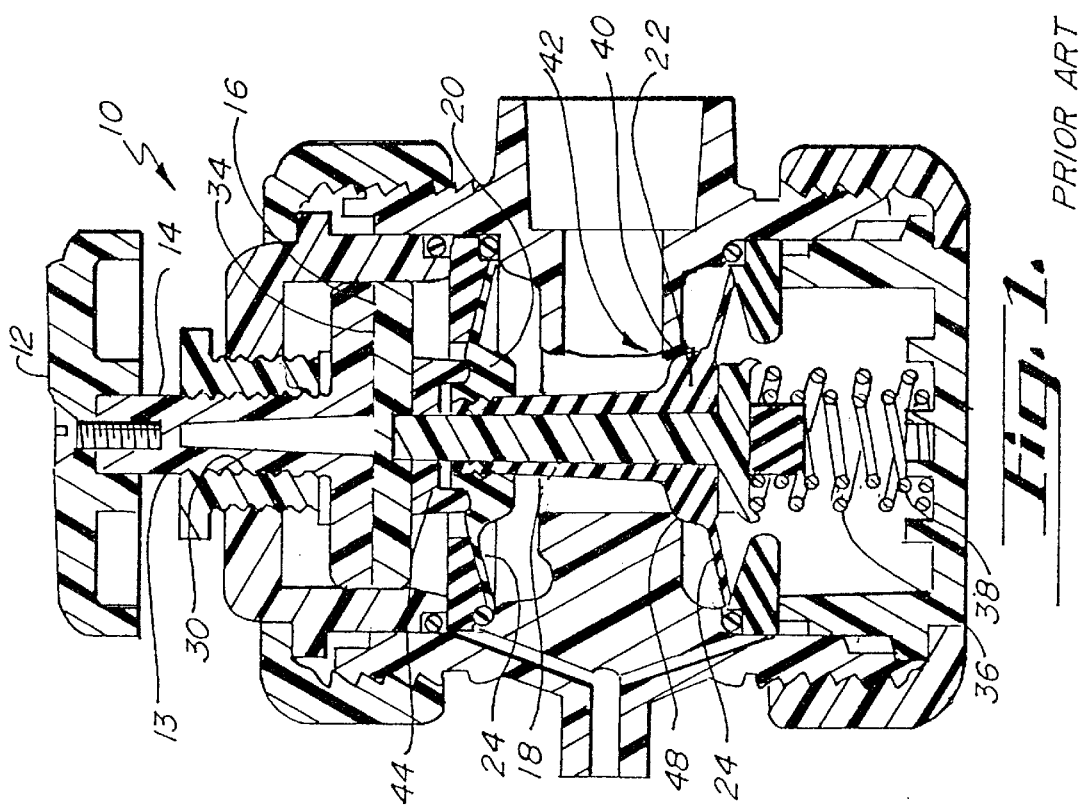

CREEP RESISTANT VALVE

This is a continuation-in-part application of U.S. application Ser. No. 09/216,656 filed Dec. 18, 1998, now abandoned. Said application is incorporated herein in its entirety by reference.

BACKGROUND OF THE INVENTION

This invention relates to valves, more particularly the invention relates to valves with plastic valve bodies and other plastic components which are subject to creep.

In the semiconductor processing industry, highly corrosive or caustic fluids are utilized with temperatures exceeding 150° C. Traditional metal valves, fittings, and plumbing are not suitable in such applications. Rather, highly inert materials such as fluoropolymers, for example PFA (perfluoroalkoxy) and PTFE (polytetrafluoroethylene), are utilized. In such applications it is critical to have a very high performance level in valves. Due to the highly caustic ultra-pure chemicals utilized, valve leakage or failure can have economically catastrophic results as well as presenting a hazard to personnel. A problem encountered with plastic in general and plastic valves in particular is that plastic under stress can creep impairing the integrity of the valve. Creep is exacerbated by high temperatures and fluctuating temperatures. Typically, the valve stem, the valve seat, and the valve body are components subject to creep under stress. Such creeping can reduce reliability, lower the life expectancy of such valves, increase maintenance of the valves, and generally increase the costs associated with the valves.

Referring to FIGS. 1 and 2, a prior art manually operated three way valve such as used in the semiconductor processing industry is illustrated and is generally designated with the numeral 10. A valve body 11 has a handle 12 extending therefrom which is rotated to operate the valve. An actuator portion 13 includes the handle, the actuator shaft 14, and a motion translation mechanism 16. The actuator portion is engaged with a valve stem assembly 18 having a first or upper valve member 20 and a second or lower valve member 22 each configured as poppets and each with a diaphragm 24 extending therefrom. The motion translation mechanism 28 may be such as a threaded shaft 32 or cam surfaces 34 for transforming the rotational motion of the handle into linear motion of the valve stem assembly. Both mechanisms are illustrated although only one would generally be used on an individual valve. A first spring 36 is positioned below the lower valve member and provides the seating pressure to seal said lower valve member and the corresponding lower valve seat 40. A supplemental spring 38 may be used. The actuation mechanism operates against the spring force to separate the lower valve member from the valve seat and open the lower valve portion 42.

The upper valve member 20 is moved axially by the motion translation mechanism which may include intermediate connecting members 44. In valves which utilize a threaded actuator shaft, the seating pressure between the valve member and valve seat can be directly dependant upon the torque provided to the handle. A disadvantages of this arrangement is that the seating pressure depends upon the subjective determination of the operator as to when the valve is tight enough. Operators tend to use excessive force closing such valves to be sure they are tight enough. This can result in immediate valve failure or cause excessive creep to the actuator mechanism including the motion translation mechanism, as well as the valve seat and other portions of the valve body. Sufficient creep to be detrimental to the operation of the valve can occur after a limited number of use cycles.

One way of addressing this problem is to provide a stop to limit the rotation of the handle and shaft to take tightening discretion away from the operator. These types of valves also are subject to creep and will typically have an adjusting nut so that the actuator mechanism can be adjusted to compensate for creep. An inherent problem with these valves is knowing when creep has occurred and knowing how much to adjust the adjustment nut. These are often subjective determinations determined by operators and thus are subject to error.

In valves which utilize the cam surfaces, the shaft will typically have a rotational stop and the sealing pressure of the valve member on the valve seat is not dependant upon the torquing of the handle as long as the handle is fully rotated. These cammed translation mechanisms effectively provide a limited rotation, for example, a quarter turn, to effectuate full closure and opening. Plastic valves utilizing the cam surfaces are also subject to creep and where the short one quarter rotation is utilized creep considerations are pronounced. These valves typically will need an adjusting nut such that after extended use the valves can then be adjusted to restore original closure pressures between the upper valve member and valve seat.

Still referring to FIG. 1, plastic valves, particularly those used the semiconductor manufacturing industry, will often have an annular groove or recess 48 at the valve seat. This feature gives the valve seat some flexibility which provides more consistency in seating and sealing, provides lowers manufacturing tolerances for the plastic components, and thus provides lower manufacturing costs. The flexible valve seat also makes the valve seat more susceptible to creep.

A valve is needed that takes the discretion away from the operator in determining how much to torque a plastic valve. A plastic three-way diaphragm valve is needed that does not need periodic adjustment to compensate for creep. A plastic valve is needed that minimizes internal stresses in the valve to minimize the occurrence of creep. A plastic valve is needed that is self-compensating for creep.

SUMMARY OF THE INVENTION

A valve made principally of plastic has a creep compensating portion that provides consistent engagement between valve members and their respective valve seats. The features compensate for contraction of internal valve components as well as extension of the valve body. Moreover, the creep compensation portion in embodiments having manual handles, limit the force applied by valve members on the valve seats. Valves according to the invention are particularly suitable for applications in the semiconductor industry.

One embodiment of the invention is a three-way diaphragm valve configuration having a first flow duct, a second flow duct, and a common flow duct. Valve portions control the flow between the first flow duct and the common flow duct as well as between the second flow duct and the common flow duct. An actuation portion operatively connected to a creep compensating portion to control the closing force provided by a first valve member on a first valve seat and a second valve member on a second valve seat. The creep compensating portion comprises a pair of captured spring mechanisms. The captured spring mechanisms self compensate for any creep of the valve components while maintaining substantially constant closure force.

In one preferred embodiment of the invention, the actuator portion includes an actuator connecting portion that moves axially up and down by rotation of a handle. This causes the valve stem assembly to move axially and the valve portions to open and close. The actuator connecting portion extends through the hollow stem and is directly engaged with the valve member of the lower valve portion and is axially slidable within the first valve member.

In said preferred embodiment, the lower spring provides upward bias to the valve stem assembly and specifically provides upward force to close the lower valve portion when the actuator connecting portion is not holding the lower valve member open. When the actuator assembly moves downwardly by rotation of the handle, the actuator shaft causes the lower valve member to be separated from the lower valve seat and correspondingly causes the first spring to be compressed by the actuator shaft. Additionally, the downward movement of the actuator assembly pushes down on the upper valve member of the upper valve portion through a creep compensating mechanism to seat the upper valve member on the upper valve seat. The creep compensating mechanism is comprised of a captured preloaded spring mechanism. The mechanism has an extended position and by providing sufficient axial compressive force may be compressed to a contracted and compressed position. The actuator mechanism is configured such that the upper valve member seats before the handle is rotated through its complete range of motion. As the handle is further rotated, the upper valve member remains seated and further downward movement of the actuator assembly compresses the trapped preloaded spring mechanism. This additional available movement of the actuator assembly then does not require a corresponding motion of the upper valve member. Thus if the valve stem compresses, that is shortens, due to creep of the plastic valve stem, the first valve member will seat slightly later that with an uncompressed valve stem and the trapped spring mechanism will still compress but will compress later in the rotational movement of the handle and will compress slightly less. The downward force of the valve member on the valve seat will be substantially the same as in the case of the uncompressed valve stem. Thus the trapped spring mechanism effectively and automatically compensates for the compressive creep in the valve stem assembly. Expansive creep in the valve body members is compensated for in a similar fashion.

A feature and advantage of particular embodiments of the invention is that valves made in accordance therewith are subjected to minimal and controlled internal stresses thereby minimizing the occurrence of creep.

A feature and advantage of particular embodiments of the invention is that creep is automatically compensated for by the valve without the need for adjustment.

A feature and advantage of certain embodiments of the invention is that no adjustment nut is needed.

A feature and advantage provided by particular embodiments of the invention is a plastic valve with a greater degree of reliability and longer life expectancy.

A feature and advantage of particular embodiments of the invention is that a quarter turn valve three way valve is possible without an adjustment nut and that has extended life expectancy and improved reliability compared to known quarter turn three-way valves.

A further significant feature and advantage of particular embodiments of the invention is that the closure force of each valve member is provided by the deflection of a separate spring. Moreover, the springs do not operate against each other to put additional stress on internal valve components. This minimizes the occurrence of creep.

Various embodiments of the invention are illustrated and described below. Note that the words "connect", "connection", and "connecting" when used herein do not require direct physical contact between the involved component, that is, intermediate components may be present. Where reference is made to a plastic valve, this does not require all components of the valve be made of plastic, only that the valve is principally constructed of plastic. Moreover, "spring" when used herein may comprise a single or multiple springs. When directions are indicated herein, such as "up", "down", "upwardly", and "downwardly", these are to be construed only as references relative positions of the valve elements and components and are not to be construed as requiring the valve or components to be placed in a specific orientation in the environment in which the valve is utilized.

BRIEF DESCRIPTION OF THE DRAWINGS

FIG. 1 is a cross sectional view of a prior art manually operated three-way valve.

FIG. 7 is an exploded view illustrating components of the actuator portion and the creep compensating portion.

FIG. 8 is a perspective view of the valve stem portion.

DETAILED SPECIFICATION

Figure 2:
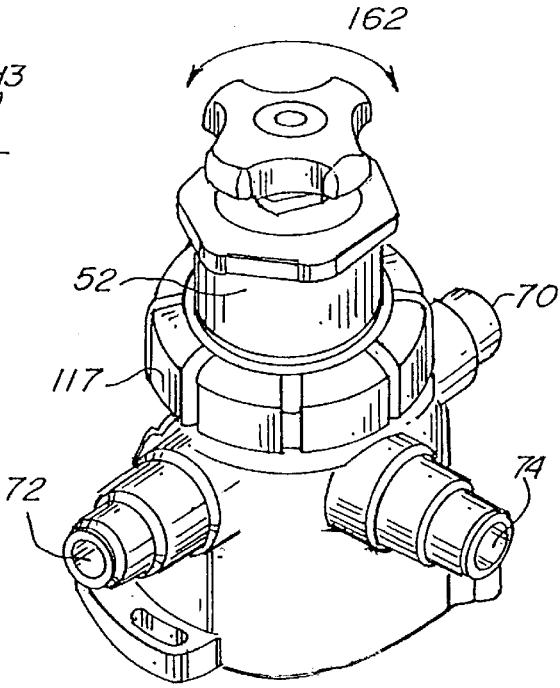
FIG. 2 is a perspective view of a manually operated three way valve. This general configuration applies to both prior art valves and valves according to the invention herein.
Figure 3:
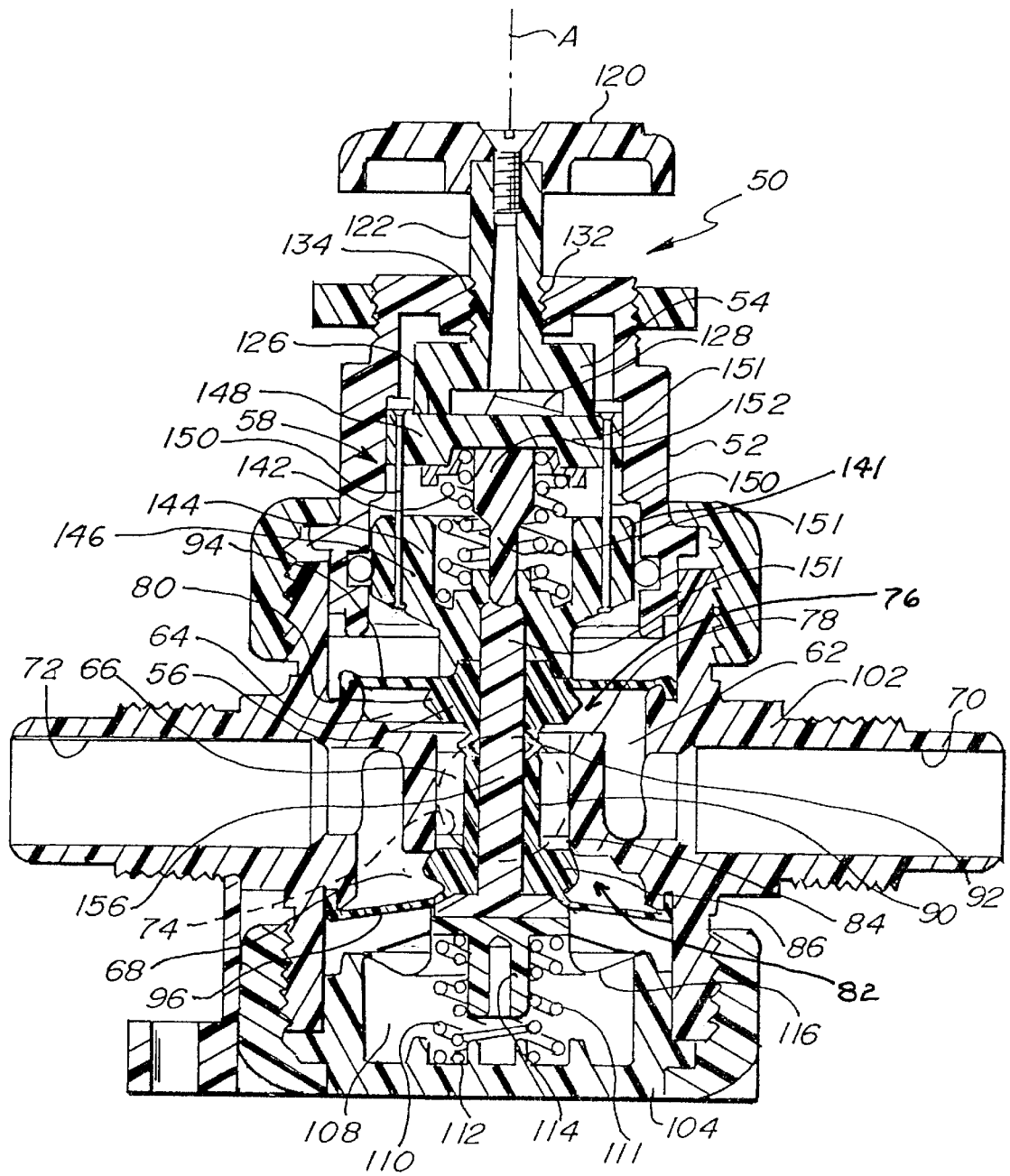
FIG. 3 is a cross sectional view of an manually operated three-way valve according to the invention.

Referring to FIGS. 2 and 3, a cross-sectional view of a preferred embodiment of the invention is shown and is generally designated with the numeral 50. The valve is made primarily of plastic components and the principal components are a valve body 52, actuator portion 54, a valve stem assembly 56 and a creep compensating portion 58. The valve body 52 has an axis A and an open interior 62 that includes an upper chamber 64, a central chamber 66, and a lower chamber 68. A first flow duct 70 extends to the upper chamber 64, a second flow duct 72 extends into the lower chamber 68 and a third or common flow duct 74 extends into the central chamber 66. Intermediate the upper chamber and the central chamber is an upper or first valve portion 76 with a first valve seat 78 which has a cooperating upper first valve member 80 configured as a poppet. Intermediate the central chamber 66 and the lower chamber 68 is lower or second valve 82 with a lower or second valve seat 84 which cooperates with a lower or second valve member 86, also poppet shaped. The first valve seat 78 separates the first flow duct 70 from the common flow duct 74 and operation of the first valve member 80 on the first valve seat controls the flow between the first flow duct and the common flow duct. Similarly, the second valve seat separates the second flow duct from the common flow duct and the operation of the second valve member on the second valve sea controls the flow between the second flow duct and the common flow duct.

Referring to FIGS. 3 and 8, the first valve member and second valve member are part of the valve stem assembly 56 which also includes the hollow stem portion 90 which has an extensible portion 92 configured as an accordion or bellows which allows the stem portion to be extensible and contractible in the axial direction. Extending from each valve member is a flexible diaphragm 94, 96, a valve stem assembly 56 may be formed from PTFE and is conveniently formed in two sections which are either mechanically secured together or sealed by welding as is known in the art. The stem assembly is appropriately machined.

The body portion 52 may be comprised of a main body portion 102, a base body portion 104 and an upper body portion 106 as best shown in FIGS. 2 and 3. The base body portion 104 has a spring chamber 108 into which is placed a second spring mechanism 110, which is a comprised of a second spring 111 and a supplemental spring 112. A spring hub 114 engages the spring 110 and has an integral diaphragm 116. The upper body portion 106 is secured to the main body portion 102 by a nut 117 and the base body portion 104 is secured to the main body portion 102 by an additional nut 118. The components of the body portion are suitably formed, such as by injection molding a fluoropolymer, for example, from PFA. The nuts 117, 118 are suitably formed from PVDF (polyvinlidene fluoride).

Referring to FIGS. 3 and 7, the actuator portion 54 is principally constrained within the upper body portion 106. The actuator portion includes the manual handle 120, the rotatable shaft 122, which is fixed to the handle and extends into the upper body portion 106 and the creep compensating portion 58. The actuator portion further includes a motion translation portion 126 which in the embodiment shown is configured as cammed portions 128 with cammed surfaces 129. Alternatively, the motion translation portion 126 may comprise a threaded portion 132 on the rotatable shaft 122 in cooperation with a threaded portion 134 on the body portion.

Contained within the body portion 52 is the creep compensating portion 58 configured as a mechanism 141 and a second captured spring mechanism 143. The first spring mechanism 141 contains the first spring 142 within a structure 144. The structure is configured as a cage having a proximal or base portion 146 with a "W" shaped cross-section, a distal or upper retention portion 148 and a plurality of elongate members configured as support pins or rods 150 extending through and between the lower base portion and upper retention portion. The lower base portion and/or upper retention portion are slidably engaged with said rods such that the trapped spring portion is contractible to a lesser axial length from that shown. A connecting portion 151 extends from the motion translation portion to the first valve member 56 and to the creep compensating portion. The connecting portion 151 comprises a connecting member 152 with a T-cross section extends downwardly from the engagement with the upper retention portion 148 to contact and engage a lower connecting member 156, also part of the connecting portion 151. Said lower connecting member extends through the hollow stem portion 90 to engage the second valve member and the second spring mechanism 143 by way of spring hub 114. The lower connecting member is suitably formed from pultruded carbon fiber filled PEEK (polyetheretherketone). The upper retention portion and lower base portion may be formed of PVDF, PFA, or the like. The support rod or pins may be configured as bolts and may be formed of carbon fiber filled pultruded PEEK or stainless steel.

The second spring mechanism 143 comprises the spring 110 as well as the lower body portion and the proximal portion or spring hub 114. In the embodiment illustrated, the engagement of the second valve member with the second valve seat limits the expansion of the second spring mechanisms. In the embodiment illustrated, the first spring mechanism moves axially and compresses while the second spring mechanism only compresses.

Downward motion of the upper T-shaped connecting member 152 causes downward motion of the lower connecting member 156 to compress the second spring 110 and to move the lower or second valve member 86 out of the closure position as shown in FIG. 2 to an open position. Said downward motion of the upper retention portion 148 will cause a corresponding downward motion of the base first spring 142 and the upper first valve member 80 until said valve member engages with and is stopped from further downward movement by way of the first valve seat 78. Then further downward movement of the upper retention portion does not cause downward movement of the lower base portion but rather compresses the first spring 142. Thus, when the first valve member is in a closure position with the upper valve seat said closure force is provided by way of the second spring 142 and the force is determined by the deflection of said spring and the spring characteristics. The first and second springs are preferably stainless steel coated with a fluoropolymer.

Figure 4:
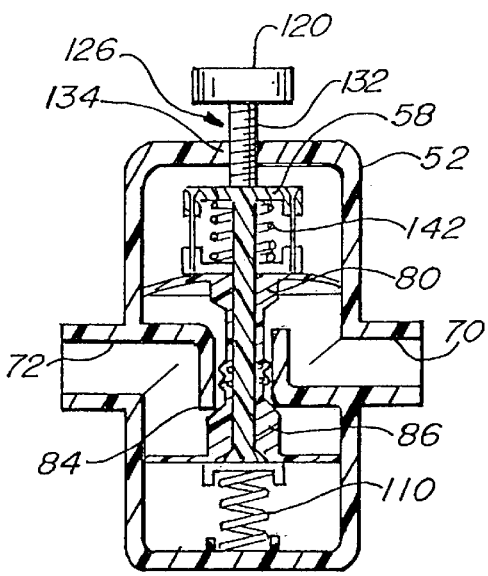
FIG. 4 is a diagrammatic cross sectional view illustrating a three way valve according to the invention with the lower valve closed.
Figure 5:
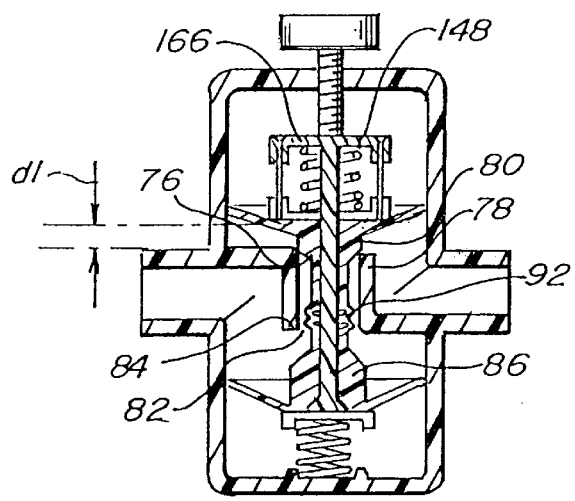
FIG. 5 is diagrammatic cross section view illustrating a three way valve according to the invention with the manual handle rotated until the upper valve member engages the upper valve seat.
Figure 6:
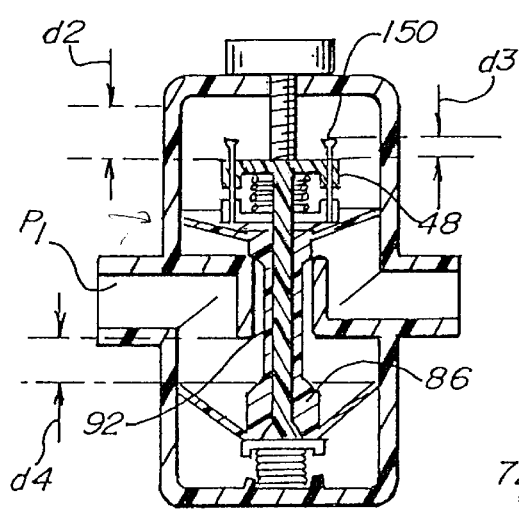
FIG. 6 is a diagrammatic cross section view illustrating a three way valve according to the invention with the manual handle rotated the maximum rotation distance where the creep compensating mechanism is contracted and the valve stem bellows portion is distended.

Referring to FIGS. 4, 5, and 6, the functioning of creep compensating features of a three-way valve are illustrated in simplified diagrammatic cross-sectional views. These figures illustrate the motion translation portion 126 as a threaded portion 132 on the shaft engaged with a threaded portion 134 on the body portion 52. In FIG. 4, the handle 120 is rotated to be fully open and the lower or second valve member 86 is in closure position with the lower or second valve seat 84 secured thereto by the closure force provided by the second spring 110. The first spring mechanism of the creep compensating portion 58 is in its fully extended position such that preloading of the first spring 142 is exerting force only against the creep compensating structure 144. The upper valve member is in the open position whereby flow is effected between the first flow duct and the common flow duct which is not shown in these figures but would extend in a direction outwardly from the page coplanar with the first and second flow ducts.

Referring to FIG. 5, the handle 120 has been rotated to the point where the first valve member 80 engages the first valve seat 78. At this point the first spring mechanism of the creep compensating portion 58 has moved downwardly but is still fully extended and the lower connecting member has pushed the second valve member 86 downwardly and has thus separated said lower valve member from the first valve seat 84. Thus, the valve portion 76 separating the first flow duct from the common flow duct is now closed and the valve portion 82 between the second flow duct and the third flow duct is open.

Referring to FIG. 6, the handle 120 has been rotated to the end of its range of rotational motion and by further downward motion of the upper retention portion 148 has contracted the first spring mechanism 141 of the creep compensating portion 58 whereby the pins 150 are extending upwardly from said portion 58. Said further downward motion of the upper retention portion 148 has also pushed the second valve member 86 further down for greater separation from the lower valve seat 84. In that the upper valve member has been obstructed from further downward movement as the lower valve member is moving, the valve stem assembly is forced to extend axially which is accommodated at the extensible portion 92. Note that the second spring is compressed in FIG. 5 as compared to FIG. 4 and is further compressed in FIG. 6. The first spring 142 in the creep compensating portion is compressed more in FIG. 6 as compared to FIGS. 4 and 5.

Thus the closure forces of the valve members on the valve seats is provided by the first and second spring mechanisms.

Any creep that takes place in the valve components will not effect to any significant degree the closure pressures nor correspondingly the integrity of the valve portions.

Referring to FIG. 2, in a preferred embodiment of a valve according to the invention, the handle and rotatable shaft will rotate a predetermined rotational distance which may be one quarter turn as indicated by the arc designated with the numeral 162. This is readily accomplished with the cam portions 128 as shown in FIG. 7. Utilizing the threaded portions as illustrated in FIGS. 4, 5, and 6, several turns would typically be necessary for the full rotational distance of such a configuration. The motion translation portions translate the rotary motion into a linear and axial motion which moves the upper valve member 80 as shown in FIGS. 4 and 5, a first predetermined linear distance d1. The rotation motion also pushes a connecting member 166, such as the upper retainer portion 148 shown in FIGS. 4, 5, and 6, a second predetermined distance d2 as is illustrated in FIG. 6. The difference between d2 and d1 equates to the contraction of the creep compensating mechanism 58 which is illustrated by the distance d3 of FIG. 6. Also in FIG. 6, the downward travel distance d4 of the lower valve member 86 is not affected by the contraction of the creep compensating portion 58 and this distance d4 equates to distance d2.

The use of the spring forces to provide closure pressures for the valve members effectively minimize the occurrence of creep and self compensate for creep that does occur. Note that such valves are suitable in environment where the fluid pressures are insufficient to overcome said closure pressures.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A three-way plastic diaphragm valve with creep compensation comprising:

a plastic valve body having a first flow duct, a second flow duct, a common flow duct, a first valve seat positioned between the first flow duct and the common flow duct, and a second valve seat positioned between the second flow duct and the common flow duct, a valve stem assembly comprising a first valve member, a first diaphragm, a second valve member, a second diaphragm, an resiliently extensible portion configured as a bellows, the first valve member, the first diaphragm, the second valve member, the second diaphragm, and the extensible portion all integral with one another, the first valve member movable into and out of a sealing position with the first valve seat for controlling flow between the first flow duct and the common flow duct and the second valve member portion movable into and out of a sealing position with the second valve seat for controlling flow between the second flow duct and the common flow duct, the extensible portion positioned between the first valve member portion and the second valve member portion allowing movement of one of the first valve member portion and the second valve member portion without movement of the other;

a first captured spring mechanism operatively engaged with the first valve member portion;

a second captured spring mechanism operatively engaged with the second valve member portion; and an actuation portion engaged with the first valve member through the first captured spring mechanism and engaged with the second valve member to move the first valve member portion into the sealing position with the first valve seat, and simultaneously compressing the second captured valve spring mechanism thereby moving the second valve member out of the sealing position with the second valve seat.

2. A valve with creep compensation comprising:

a plastic valve body having a first flow duct, a second flow duct, a common flow duct, a first valve seat positioned between the first flow duct and the common flow duct, a second valve seat positioned between the second flow duct and the common flow duct;

a first valve member portion movable into and out of a sealing position with the first valve seat for controlling flow between the first flow duct and the common flow duct;

a second valve member portion movable into and out of a sealing position with the second valve seat for controlling flow between the second flow duct and the common flow duct;

a first captured spring operatively engaged with the first valve member portion, a second captured spring operatively engaged with the second valve member portion, and an actuation portion including a resiliently extensible portion configured as a bellows engaged with the first valve member through the first captured spring and engaged with the second valve member to move the first valve member portion into the sealing position with the first valve seat, and simultaneously moving the second valve member out of the sealing position with the second valve seat by compressing the second captured valve spring.

3. A three-way valve having creep compensation, the valve comprising:

a plastic valve body having an axis, a first flow duct, a second flow duct, a common flow duct, a first valve seat positioned between the first flow duct and the common flow duct, a second valve seat positioned between the second flow duct and the common flow duct, a first valve member portion axially movable into and out of a sealing position with the first valve seat for controlling flow between the first flow duct and the common flow duct;

a second valve member portion movable into and out of a sealing position with the second valve seat for controlling flow between the second flow duct and the common flow duct;

an actuation portion including a resiliently extensible portion configured as a bellows for moving the first valve member into and out of the sealing position with the first valve seat and for moving the second valve member into and out of the sealing position with the second valve seat; and a creep compensation portion comprising at least one captured spring mechanism, the creep compensation portion operatively connected to the actuation portion and the first and second valve members, and wherein the creep compensation portion limits a closure force applied by the first valve member to the first valve seat and further limits a closure force applied by the second valve member to the second valve seat.

* * * * *